Oct. 30, 1928.  V. LINK ET AL  1,689,554
BRAKE
Filed June 28, 1926
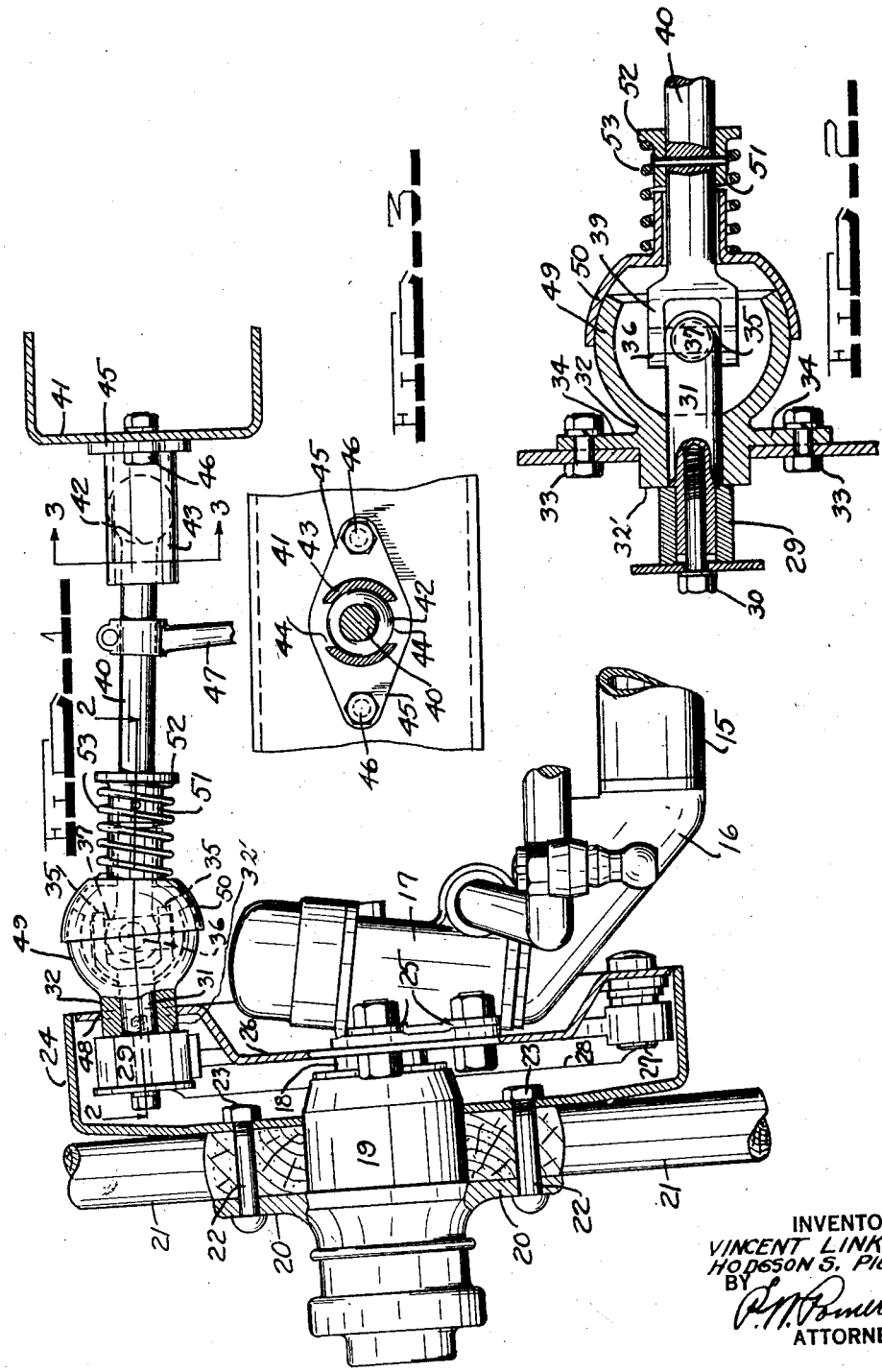
INVENTOR
VINCENT LINK
HODGSON S. PIERCE
BY
ATTORNEY Patented Oct. 30, 1928.

1,689,554

UNITED STATES PATENT OFFICE.

VINCENT LINK AND HODGSON S. PIERCE, OF DETROIT, MICHIGAN, ASSIGNORS TO THE STUDEBAKER CORPORATION, OF SOUTH BEND, INDIANA, A CORPORATION OF NEW JERSEY.

BRAKE.

Application filed June 28, 1926. Serial No. 119,098.

This invention relates to brake mechanism for motor vehicles, and particularly to means for holding parts of such mechanism for longitudinal movement while permitting rotational movement, the principal object being to provide a construction which is simple, efficient and economical to manufacture.

Another object is to provide a simplified means for holding a rotatable brake shaft against longitudinal movement relative to its support.

Another object is to provide a fixed support for a rotatable shaft, a fixed stop on the shaft, a portion slidable on the shaft and contracting with the support, and a coil spring interposed on the shaft between the fixed stop and the slidable portion, thereby to prevent undue axial movement of the shaft relative to the support.

A further object is to provide means for preventing axial movement of a rotatable shaft projecting through a supporting wall comprising an opening in the wall, a bracket projecting through and engaging the walls of the opening and providing with flanged means engaging the surface of said wall, the rotatable shaft projecting through said bracket, and adapted to receive a member slidable thereon, a stop fixed to said shaft, and a coil spring interposed between the slidable portion and the fixed stop.

A still further object is to provide a means for supporting the inner end of the shaft, mentioned in the preceding objects, to the chassis frame, comprising a bracket secured to the frame and having an outwardly extending tubular portion with portions cut away at the top and bottom thereof, said tubular portion receiving a ball-shaped end on the shaft, thereby providing sliding and pivotal support for the end of the shaft to compensate for movement of the frame relative to the axle.

These being among the objects of the present invention, the same consists of certain features of construction and combinations of parts to be described hereinafter with reference to the accompanying drawing, and then claimed, having the above and other objects in view.

In the accompanying drawing which illustrates a suitable embodiment of the present invention, Figure 1 is a vertical section taken through the left front wheel of a motor vehicle chassis and adjacent frame side member, showing the construction of the brake operating means comprising this invention.

Figure 2 is a section taken on the line 2—2 of Figure 1, clearly showing the method of preventing axial movement of the brake cam shaft relative to its fixed supporting bracket.

Figure 3 is a section taken on the line 3—3 of Figure 1, more clearly showing the method of slidably and pivotally anchoring the free end of the shaft to the vehicle frame.

Referring to the accompanying drawing in which like numerals refer to like parts throughout the several views, the embodiment of the present invention is shown in connection with the front wheel brake mechanism of a motor vehicle to which it is particularly adapted. Shown in Figure 1 is a tubular front axle 15 provided with an end member 16 terminating in an upwardly extending pin (not shown), upon which the steering knuckle 17 is pivotally supported, the knuckle 17 being provided with an outwardly projecting wheel spindle 18 upon which the wheel hub 19 is rotatably supported. The hub 19 is provided with a flange 20 against which the wheel spokes 21 abut and which are secured thereto by the bolts 22 and nuts 23 which also serve to support and secure the brake drum 24 to the hub 19 in concentric relation therewith. The knuckle 17 is provided with flanges 25 against which is secured the brake drum dust cover 26 in concentric relation with the drum 24, the cover 26 closing the open end thereof.

Within the brake drum 24 and pivotally supported on the adjacent pins 27 secured to the dust cover 26 are the two brake shoes 28, the outer surfaces of which normally lie just out of contact in relationship with the inner surface of the drum 24, and whose free ends rest and are drawn against the expanding cam 29 by a spring (not shown) extending therebetween. The cam 29 is secured by a cap screw 30 to the squared end of a short shaft 31 which projects through the dust cover 26 and is rotatably supported in the bracket 32 which also projects through the dust cover 26 and is secured thereto by the screws 33 which pass through the flanges 34 thereof.

The end of the shaft 31 opposite the cam 29 is formed to provide two arms 35 which serve as one yoke of a universal joint comprising cross pins 36 and 37 and a yoke 39 formed on the end of the operating shaft 40. The operating shaft extends inwardly toward, and terminates short of the vehicle side frame member 41, which termination is provided with a ball-shaped end 42 which is universally supported on the frame member 41 by a bracket provided with an outwardly extending tubular portion 43 having openings 44 cut out at the top and bottom of slightly greater width than the diameter of the operating shaft 40, the ball end 42 being free to pivot and free to slide within the tubular bracket 43. The bracket 43 is formed with flanges 45 through which bolts 46 extend and secure it to the frame member 41.

A lever 47 is secured to the shaft 40 and is adapted to cause movement thereof when rotated about its axis, thereby acting to cause rotation of the cam 29 and spreading of the shoes 28 into contact with the drum 24 to effect a braking action on the wheel.

In constructions of this type, wherein the brake operating shaft is anchored at one end by the vehicle frame and the other end is on, or on a part supported by, the end of the axle, the distance between the point of support on the frame and on the axle varies with the movement of the axle relative to the frame, due both to vertical and horizontal movement of the springs which support the frame on the axle. The sliding connection between the ball end 42 and tubular bracket 43 is provided for compensating for this action, but it will be apparent that means must be provided for preventing axial displacement of the cam 29 which, were it not anchored against axial movement, might tend, with the shaft 40, to move axially during relative movement between the axle 15 and frame 41, particularly if undue friction developed between the ball end 42 and bracket 43. The present invention deals with means for preventing such axial movement of the cam 29 as follows:

As has been described, the bracket 32 is secured to the dust cover 26 which supports it and which is held relatively stationary in respect to the axle 15 by the screws which pass through the dust cover 26 and into the flanges 34. As has also been described, the bracket projects through the dust cover 26, it being guided and being located thereon by reason of the fact that the portion which projects through the dust cover 26 is in contacting relation with the walls 48 of the opening in the dust cover through which it projects. Its axial position in respect to the dust cover 26 is governed by the flanges 34 which are secured in abutting relation thereto. The portion of the bracket 32 on the outside of the dust cover 26 is shaped to form a large spherical-shaped shell 49, which partly encloses the universal joint connection between the operating shaft 40 and short cam shaft 31, and slidably positioned on the shaft 40 is a spherical shell 50, which encloses the remainder of the universal joint and fits around and slidably contacts with the outer surface of the shell 49. Secured in fixed position to the shaft 40 a slight distance from the edge of the shank of the shell 50 is an annular ring 51 having a flange 52, and interposed around the shank of the shell 50 and ring 51 between the flange 52 and flaring portion of the shell 50 is the coil spring 53, which is always in compression.

It can plainly be seen that the compression in the spring 53 will force the shell 50 firmly against the shell 49 which will cause, through the pressure on the flange 52 of the stop 51, the shaft 40 to draw the end of the cam 29 firmly against the abutting face 32' of the bracket 32 to form a positive stop for limiting the axial movement of the cam 29. The pressure in the spring is sufficient to compensate for any axial movement of the shaft 31 in the bracket 32 which might occur and still permit the cam 29 to be freely rotated by the shaft 40, thereby preventing the free ends of the shoes 28 from misaligning and causing uneven braking pressure on the drum 24.

The simplicity of supporting the inner end to the frame side member is also to be noted.

Formal changes may be made in the specific embodiment of the invention described, without departing from the spirit and substance of the broad invention, the scope of which is commensurate with the appended claims.

What we claim is:

1. In a brake mechanism for a motor vehicle, a bracket carrying a rotatable shaft, a cam on said shaft, a coil spring for resiliently holding said cam against said bracket, and an abutment for said spring operatively connected to said shaft forming with said cam the sole means for positively limiting axial movement of said cam with respect to said bracket.

2. In a brake mechanism for a motor vehicle, a rotatable cam, and a coil spring held under compression between two substantially contacting abutments and tending to hold said cam against axial movement, one of said abutments providing the sole stop for positively limiting the axial movement of said cam in one direction.

3. In a brake mechanism for a motor vehicle, an open-ended bracket carrying a rotatable shaft, a cam on one end of said shaft bearing against said brackt, a second shaft universally connected within said open end to the first-mentioned shaft, a cover for said open end carried by said second shaft and axially slidable thereon, an abutment on said second shaft in close proximity to said cover, and a coil spring encircling said second shaft and held under compression between said cover and said abutment whereby to resiliently hold said cover and said cam in contact with said bracket, said abutment providing the sole stop for limiting the axial movement of said cam away from said bracket.

4. In combination with a brake support, a bracket secured thereto receiving a rotatable shaft, a brake cam on one end of said shaft, means on the other end of said shaft for universally connecting the same to a second shaft, a spherical surface on said bracket, a spherically-surfaced cover carried by said second shaft and co-operating with said spherical surface on said bracket, spring means for resiliently holding said cam against axial movement and for holding said cover in contact with said bracket, and a collar on said second shaft co-operating with said cover to form the sole stop for limiting the axial movement of said cam in one direction.

5. In a motor vehicle, brake mechanism for a wheel thereof including a bracket, a rotatable shaft carried by said bracket provided with a cam on one end thereof, means for resiliently holding said cam against axial movement, a positive stop for limiting the axial movement of said cam, a brake operating shaft universally connected to the first-mentioned shaft extending inwardly therefrom and terminating in a ball adjacent the frame of said vehicle, and means for supporting the inner end of said operating shaft so as to allow axial movement thereof, said means comprising a tubular support rigidly secured to said frame for receiving said ball, said tubular support being slotted on its upper and lower faces to provide clearance for the movement of said second shaft.

6. In a motor vehicle, braking means for a wheel thereof comprising a brake operating axially movable shaft extending inwardly therefrom and terminating in a ball, and a tubular support rigidly secured to the frame of said vehicle for receiving said ball, said support being slotted on its upper and lower surfaces to permit movement of said shaft angularly therethrough.

7. In a motor vehicle, braking means for a wheel thereof, a brake operating shaft extending inwardly therefrom and terminating in a ball, a support rigidly secured to the frame of said vehicle provided with an opening for receiving said ball, and slots in said support for allowing swinging movement of said shaft in respect thereto.

8. In a brake mechanism for a motor vehicle, a bracket carrying a rotatable shaft, a cam on said shaft abutting against one side of said bracket, a second shaft universally secured to the first mentioned shaft, a cover member carried by said second shaft, a collar secured to said second shaft in substantial contacting relationship with said cover, and a coil spring positioned between said cover and said collar for holding said cam against said bracket, said collar forming the sole positive stop for limiting axial movement of said cam away from said bracket.

Signed by us at Detroit, Michigan, U. S. A., this 25th day of June, 1926.

VINCENT LINK.
HODGSON S. PIERCE.